(No Model.) 2 Sheets—Sheet 1.

S. D. KEENE.
MACHINE FOR OPENING AND CLEANING COTTON.

No. 307,199. Patented Oct. 28, 1884.

WITNESSES.
M. E. Fowler.
Jno. C. Schroeder

INVENTOR.
Samuel D. Keene
by Geo. W. Dyer
Atty (No Model.)  2 Sheets—Sheet 2.

S. D. KEENE.
MACHINE FOR OPENING AND CLEANING COTTON.

No. 307,199.  Patented Oct. 28, 1884.

Witnesses.
M. E. Fowler.
Jno. C. Schroeder.

Inventor-
Samuel D. Keene
by Geo. W. Dyer
Atty.

UNITED STATES PATENT OFFICE.

SAMUEL D. KEENE, OF PROVIDENCE, RHODE ISLAND, ASSIGNOR TO LEVI WILSON, OF SAME PLACE.

MACHINE FOR OPENING AND CLEANING COTTON.

SPECIFICATION forming part of Letters Patent No. 307,199, dated October 28, 1884.

Application filed May 20, 1884. (No model.)

*To all whom it may concern:*

Be it known that I, SAMUEL D. KEENE, of Providence, in the county of Providence and State of Rhode Island, have invented a new and useful Improvement in Machines for Opening and Cleaning Cotton; and I do hereby declare that the following is a full and exact description of the same, reference being had to the accompanying drawings, and to the letters of reference marked thereon.

My invention consists in the peculiar construction of the rotating grill, in the combination, with the rotating grill, of feed-rolls driven at a greater velocity than the rotating grill, and in the combination of the feeding-rolls and grill with the beaters and condensers, all as and for the purposes hereinafter more fully described and claimed.

Figure 1:
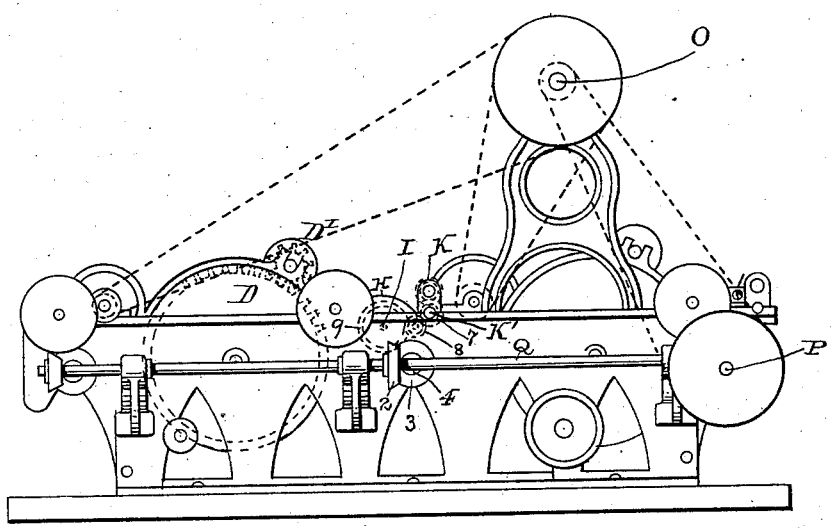
Figure 2:
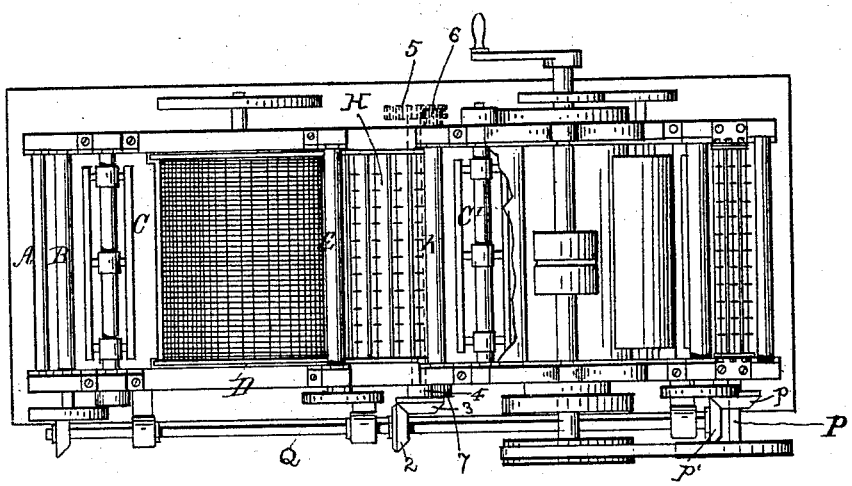
Figure 3:
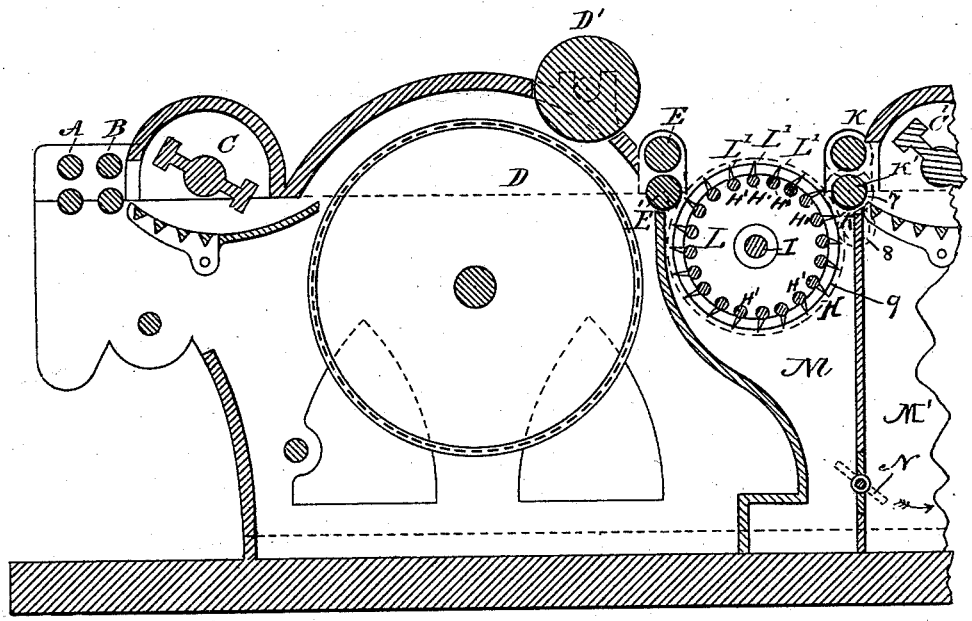
Figure 4:
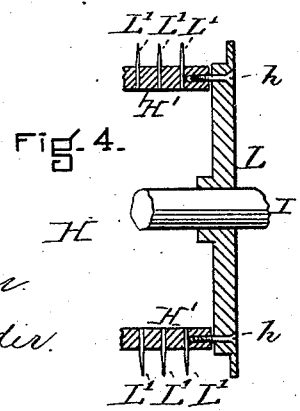

Referring more particularly to the accompanying drawings for a better comprehension of my invention, Figure 1 represents a side elevation of a machine embodying my invention; and Fig. 2, a plan view of the same, the beater and condenser-casing being removed for the purpose of showing the interior parts more clearly. Fig. 3 represents a longitudinal vertical section of a part of the machine, showing details somewhat enlarged, and more especially the revolving grill, to which my invention particularly appertains. Fig. 4 represents a detail sectional view showing the manner of attaching the grill-bars to the revolving disks.

A and B represent pairs of feeding-rolls, C the first and C' the second beater, D D' the condensing-cylinders, E E' the first and K K' the second set of delivery-rolls, O the counter-shaft, P the cross feed-shaft, and Q the side driving-shaft, all of which parts are or may be of the usual well-known construction and arrangement, and will be operated as is usual in this class of machines, the gist of my invention relating to the revolving grill and the parts co-operating therewith, which will now be particularly described.

H is a revolving grill arranged between the first set, E E', and second set, K K', of the delivery-rolls. This grill is composed of two end disks, L, mounted upon a shaft, I, and a series of bars, H', pivoted between said end disks L by means of a set-screw, *h*, as shown in Fig. 4. Each of these bars H' is provided with a series of teeth, L', which project from said bars, and between which the staple is drawn by the action of the rolls K K', from whence it is then delivered to the second beater, C'. As before stated, each of the bars H' is, as shown in Fig. 4, secured at its ends by a set-screw, *h*, which passes through the end disks, L, and enters the ends of the bars, and thereby forms a pivot upon which said bars may be turned at will to change the angle of the teeth L', to suit different staple of cotton. For some staple these pins L' may be merely radial, while other qualities of staple require that the pins be more nearly tangential, so that they may offer but little resistance to the staple that is drawn over them. The desired adjustment radially or tangentially of these bars H' may be made by hand, as each bar is hung upon a pivot at each end to the end disks L by means of the screws *h*, as before explained, which also serve to retain said bars in the desired position after the adjustments have been made. The action of passing the staple over the grill causes its fiber to be laid parallel and ready for delivery by the feed-rolls of the succeeding beater.

To revolve the grill the following mechanism is employed: On the shaft of the lower roll, K', which is driven from the side driving-shaft, Q, through the intermediary of gear-wheel 2 on said shaft, gear-wheels 3 and 5 on shaft 4, and gear-wheel 6 on the lower roll, K', is attached a gear-wheel, 7, which, in turn, drives an intermediate gear-wheel, 8, which in turn revolves a gear-wheel, 9, attached to one end of the shaft I of the grill H, and by means of which said grill is revolved. It will thus be seen that the grill H derives its movement from an intermediate gear-wheel driven through the intervention of proper mechanism from the side shaft engaging with the gear-wheel on the shaft of the grill, and that the gear-wheel 7 on the lower feed-roll, K', as well as the gear-wheel 9 on the end of the shaft of the grill, may be changed for other gears of larger or smaller size, and the speed of the said grill and feed-rolls correspondingly changed. These interchangeable gears are so proportioned in size that although the speed of the parts may be increased or decreased, yet the peripheral velocity of the grill will at all times be less than that of the staple passing over it, in order that a dragging action will take place thereon and the cotton properly distended in the direction of strain.

Immediately under the revolving grill H, I make a chamber, M, Fig. 3, connected by a damper, N, with an exhaust-space, M', so that I am enabled to use it either as a dead-air box or for a wind-chamber, as desired.

Having thus described my invention, what I claim as new therein, and desire to secure by Letters Patent of the United States, is—

1. The grill H, composed of the end disks, L, shaft I, upon which said disks are mounted, adjustable bars H', provided with the teeth L', and means for pivoting said bars between the disks L, as and for the purposes specified.

2. The combination, with the beater C, condenser D D', and feed-rolls E E', of the rotating grill H, composed of end disks, L, shaft I, and adjustable toothed bars H' L', as and for the purposes specified.

3. The combination, with the beater C, condenser D D', feed-rolls E E', and revolving grill H, constructed as described, of the second set of feed-rolls, K K', and beater C', all constructed and arranged as and for the purposes set forth and shown.

In testimony whereof I affix my signature in presence of two witnesses.

SAMUEL D. KEENE.

Witnesses:
H. B. ZEVELY,
GEO. H. COOPER.